US010795170B2

(12) United States Patent
Du et al.

(10) Patent No.: US 10,795,170 B2
(45) Date of Patent: Oct. 6, 2020

(54) MULTI-CHANNEL OPTICAL MULTIPLEXER OR DEMULTIPLEXER

(71) Applicant: Finisar Corporation, Sunnyvale, CA (US)

(72) Inventors: Tengda Du, San Jose, CA (US); Xiaojie Xu, Pleasanton, CA (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/193,737

(22) Filed: Nov. 16, 2018

(65) Prior Publication Data
US 2020/0159034 A1 May 21, 2020

(51) Int. Cl.
*H04J 14/02* (2006.01)
*G02B 27/10* (2006.01)
(Continued)

(52) U.S. Cl.
CPC ....... *G02B 27/1006* (2013.01); *G02B 27/126* (2013.01); *H04J 14/02* (2013.01);
(Continued)

(58) Field of Classification Search
CPC .............. G02B 27/1006; G02B 27/126; G02B 6/29361; G02B 6/29365; G02B 6/29367; H04J 14/02; H04J 14/00
(Continued)

(56) References Cited

U.S. PATENT DOCUMENTS

| 5,005,935 A | * | 4/1991 | Kunikane | .......... G02B 6/29367 385/24 |
| 6,167,171 A | * | 12/2000 | Grasis | .................. G02B 6/2938 385/24 |

(Continued)

FOREIGN PATENT DOCUMENTS

JP 2009198576 A 9/2009

OTHER PUBLICATIONS

Lemoff et al., Zigzag waveguide demultiplexer for multimode WDM LAN, Electronics Letters, vol. 34, No. 10, May 14, 1998, pp. 1014-1016.

(Continued)

*Primary Examiner* — Dibson J Sanchez
(74) *Attorney, Agent, or Firm* — Maschoff Brennan

(57) ABSTRACT

In an example embodiment, a method includes receiving a first combined optical signal at an edge filter. The method further includes redirecting, at the edge filter, a second combined optical signal toward a first zigzag demultiplexer; and passing a third combined optical signal through the edge filter toward a light redirector based on wavelength. The method further includes redirecting the third combined optical signal toward a second zigzag demultiplexer. The method may further includes separating, at the first zigzag demultiplexer, the second combined optical signal into a first optical signal on a first optical path and a second optical signal on a second optical path based on wavelength. The method further includes separating, at the second zigzag
(Continued)

demultiplexer, the third combined optical signal into a third optical signal on a third optical path and a fourth optical signal on a fourth optical path based on wavelengths.

17 Claims, 5 Drawing Sheets

(51) Int. Cl.
    *G02B 27/12* (2006.01)
    *H04J 14/00* (2006.01)
    *G02B 6/293* (2006.01)

(52) U.S. Cl.
    CPC ...... *G02B 6/29361* (2013.01); *G02B 6/29365* (2013.01); *H04J 14/00* (2013.01)

(58) Field of Classification Search
    USPC .................................................. 398/43–103
    See application file for complete search history.

(56) References Cited

U.S. PATENT DOCUMENTS

| | | | | |
|---|---|---|---|---|
| 7,054,526 B2* | 5/2006 | Naruse | ............... | G02B 6/29326 385/129 |
| 7,212,343 B1* | 5/2007 | He | ............... | G02B 6/29365 359/618 |
| 7,843,644 B1* | 11/2010 | Wang | ............... | G02B 6/262 359/641 |
| 7,912,374 B1* | 3/2011 | Wang | ............... | G02B 3/0087 359/634 |
| 8,351,791 B1* | 1/2013 | Wang | ............... | H04J 14/02 398/85 |
| 8,488,244 B1* | 7/2013 | Li | ............... | G02B 27/1006 359/618 |
| 8,537,468 B1* | 9/2013 | Wang | ............... | G02B 27/0025 359/619 |
| 8,625,989 B2 | 1/2014 | Du | | |
| 9,350,454 B2 | 5/2016 | Xu | | |
| 9,401,773 B1* | 7/2016 | Gui | ............... | H04J 14/02 |
| 9,419,718 B2* | 8/2016 | Gothoskar | ............... | H04B 10/40 |
| 9,485,046 B1* | 11/2016 | Tang | ............... | H04J 14/02 |
| 9,551,833 B1* | 1/2017 | Li | ............... | H04J 14/02 |
| 9,590,759 B1* | 3/2017 | Peng | ............... | H04J 14/02 |
| 9,804,332 B1* | 10/2017 | Wang | ............... | G02B 6/29365 |
| 9,843,394 B2* | 12/2017 | Xiao | ............... | H04B 10/40 |
| 9,983,357 B2* | 5/2018 | Miyata | ............... | G02B 6/29367 |
| 10,012,796 B2* | 7/2018 | Xiao | ............... | G02B 6/29365 |
| 10,182,275 B1* | 1/2019 | Xiao | ............... | G02B 6/24 |
| 10,187,175 B2* | 1/2019 | Iwasaki | ............... | G02B 6/2938 |
| 2002/0057868 A1* | 5/2002 | Wu | ............... | G02B 6/29367 385/24 |
| 2002/0118915 A1* | 8/2002 | Sagan | ............... | G02B 6/29367 385/24 |
| 2002/0131180 A1* | 9/2002 | Goodman | ............ | G02B 6/29367 359/634 |
| 2002/0154857 A1* | 10/2002 | Goodman | ............ | G02B 6/2713 385/24 |
| 2003/0058520 A1* | 3/2003 | Yu | ............... | G01J 3/021 359/291 |
| 2003/0099434 A1* | 5/2003 | Liu | ............... | G02B 6/29367 385/31 |
| 2003/0128917 A1* | 7/2003 | Turpin | ............... | G02B 6/2861 385/24 |
| 2004/0005115 A1* | 1/2004 | Luo | ............... | G02B 6/29367 385/24 |
| 2004/0067014 A1* | 4/2004 | Hollars | ............... | G02B 6/29365 385/33 |
| 2007/0030567 A1* | 2/2007 | Froehlich | ............... | G01J 3/02 359/577 |
| 2008/0285974 A1* | 11/2008 | Takahashi | ............ | G02B 6/29365 398/87 |
| 2010/0329678 A1* | 12/2010 | Wang | ............... | G02B 6/29367 398/79 |
| 2013/0177320 A1* | 7/2013 | Du | ............... | H04B 10/40 398/115 |
| 2014/0294386 A1* | 10/2014 | Shinada | ............... | H04B 10/60 398/65 |
| 2015/0055665 A1* | 2/2015 | Nakajima | ............ | H04J 14/0213 370/542 |
| 2015/0318951 A1 | 11/2015 | Zhang et al. | | |
| 2016/0187585 A1* | 6/2016 | Yue | ............... | G02B 6/2938 398/82 |
| 2016/0191192 A1* | 6/2016 | Yue | ............... | G02B 6/2938 398/83 |
| 2016/0269808 A1* | 9/2016 | Du | ............... | H04B 10/506 |
| 2017/0134099 A1 | 5/2017 | Hara et al. | | |
| 2017/0230116 A1* | 8/2017 | Sorin | ............... | H01S 5/026 |
| 2017/0254958 A1* | 9/2017 | Yue | ............... | G02B 6/327 |
| 2017/0261691 A1* | 9/2017 | Yue | ............... | G02B 6/29368 |
| 2018/0128983 A1* | 5/2018 | Huang | ............... | G02B 6/29365 |
| 2018/0139520 A1* | 5/2018 | Xiao | ............... | G02B 6/2938 |
| 2018/0212708 A1* | 7/2018 | Tian | ............... | H04J 14/06 |
| 2018/0220208 A1* | 8/2018 | Gui | ............... | H04Q 11/0005 |
| 2019/0103936 A1* | 4/2019 | Kawamura | ............ | H04J 14/0215 |
| 2019/0109650 A1* | 4/2019 | Mii | ............... | G02B 6/4215 |
| 2020/0044738 A1* | 2/2020 | Leigh | ............... | H04J 14/06 |

OTHER PUBLICATIONS

International Search Report and Written Opinion dated Feb. 24, 2020, in related PCT Application No. PCT/US2019/061729 (13 pages).

\* cited by examiner

MULTI-CHANNEL OPTICAL MULTIPLEXER OR DEMULTIPLEXER

FIELD

Embodiments discussed herein are related to a multi-channel optical multiplexer or demultiplexer.

BACKGROUND

Unless otherwise indicated herein, the materials described herein are not prior art to the claims in the present application and are not admitted to be prior art by inclusion in this section.

Optoelectronic modules, such as optoelectronic transmitter, receiver, and transceiver modules, are increasingly used in electronic and optoelectronic communication. Optoelectronic modules typically communicate with a printed circuit board of a host device by transmitting electrical signals to the printed circuit board and receiving electrical signals from the printed circuit board. These electrical signals can then be transmitted by the module outside the host device as optical signals. Additionally or alternatively, the module may receive optical signals from outside the host device which may then be transmitted to the printed circuit board as electrical signals.

Multi-source agreements (MSAs), such as the C Form-factor Pluggable (CFP) MSA and the Quad Small Form-factor Pluggable (QSFP) MSA, specify, among other things, housing dimensions for modules. Conformity with an MSA allows a module to be plugged into host equipment designed in compliance with the MSA.

Optical signals are typically generated within a transmitter optical subassembly (TOSA) of a module using a laser, such as a vertical cavity surface emitting laser (VCSEL) or a distributed feedback (DFB) laser. Optical signals are typically received within a receiver optical subassembly (ROSA) of a module using a photodetector (PD), such as a photodiode. As data rates in modules increase, two or more lasers are often included in a single TOSA and two or more PDs are often included in a single ROSA. However, as MSAs specify increasingly smaller module housing dimensions, there is less available space for multi-laser TOSAs and multi-PD ROSAs within the module housing. In addition, multi-laser TOSAs are often relatively expensive and often suffer from relatively high optical loss.

The subject matter claimed herein is not limited to implementations that solve any disadvantages or that operate only in environments such as those described above. Rather, this background is only provided to illustrate one example technology area where some implementations described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described herein generally relate to systems and methods to multiplex or demultiplex optical signals.

In an example embodiment, a method may include receiving, at an edge filter, a first combined optical signal. The first combined optical signal may include a first optical signal having a first center wavelength, a second optical signal having a second center wavelength, a third optical signal having a third center wavelength, and a fourth optical signal having a fourth center wavelength. The method may further include separating, at the edge filter, the first combined optical signal into a second combined optical signal and a third combined optical signal based on wavelength. The second combined optical signal may include the first optical signal and the second optical signal; and the third combined optical signal may include the third optical signal and the fourth optical signal. The separating may include redirecting, at the edge filter, the second combined optical signal toward a first zigzag demultiplexer; and passing the third combined optical signal through the edge filter toward a light redirector. The method may further include redirecting, at the light redirector, the third combined optical signal toward a second zigzag demultiplexer. The method may further include separating, at the first zigzag demultiplexer, the second combined optical signal into the first optical signal on a first optical path and the second optical signal on a second optical path based on the first center wavelength and the second center wavelength. The method may further include separating, at the second zigzag demultiplexer, the third combined optical signal into the third optical signal on a third optical path and the fourth optical signal on a fourth optical path based on the third center wavelength and the fourth center wavelength.

In another example embodiment, a method may include combining, at a first zigzag multiplexer, a first optical signal having a first center wavelength and a second optical signal having a second center wavelength into a first combined optical signal based on the first center wavelength and the second center wavelength. The method may further include combining, at a second zigzag multiplexer, a third optical signal having a third center wavelength and a fourth optical signal having a fourth center wavelength into a second combined optical signal based on the third center wavelength and the fourth center wavelength. The method may further include redirecting the second combined optical signal onto an output optical path using a light redirector. The method may further include redirecting, at an edge filter, the first optical signal onto the output optical path based on the first wavelength and the second wavelength.

In another example embodiment, a system may include a first zigzag multiplexer or demultiplexer ("mux/demux"). The first zigzag mux/demux may include a first zigzag optical path. The first zigzag optical path may include multiple first segments and multiple second segments. The first segments may be parallel to and spaced apart from each other. The second segments may be parallel to and spaced apart from each other. The second segments may be arranged at an angle to the first segments. Each of the second segments may be optically coupled between opposite ends of a corresponding pair of adjacent first segments such that one end of each second segment is optically coupled to a filter end of a first corresponding first segment in the corresponding pair and an opposite end of each second segment is optically coupled to a reflection end of a second corresponding first segment in the corresponding pair. The system may also include a first plurality of optical filters coupled to the first zigzag mux/demux, including one each coupled to the first zigzag mux/demux in optical communication with the first zigzag optical path at each of multiple filter vertices in the first zigzag optical path formed where one end of a corresponding second segment is optically coupled to the filter end of a corresponding first segment. The system may also include a second zigzag multiplexer or demultiplexer ("mux/demux"). The second zigzag mux/demux may include a second zigzag optical path. The second zigzag optical path may include multiple third segments and multiple fourth segments. The third segments may be parallel to and spaced apart from each other. The fourth segments may be parallel to and spaced apart from each other. The fourth segments may be arranged at an angle to the third segments. Each of the fourth segments may be optically coupled between opposite ends of a corresponding pair of adjacent third segments such that one end of each fourth segment is optically coupled to a filter end of a first corresponding third segment in the corresponding pair and an opposite end of each fourth segment is optically coupled to a reflection end of a second corresponding third segment in the corresponding pair. The system may also include a second plurality of optical filters coupled to the second zigzag mux/demux, including one each coupled to the second zigzag mux/demux in optical communication with the second zigzag optical path at each of multiple filter vertices in the second zigzag optical path formed where one end of a corresponding fourth segment is optically coupled to the filter end of a corresponding third segment. The system may also include an edge filter coupled to the first zigzag mux/demux in optical communication with a first or last filter vertex of the first zigzag optical path. The edge filter may have a reflectance spectrum that includes center wavelengths of transmission spectra of the first plurality of optical filters. The edge filter may also have a transmission spectrum that includes center wavelengths of transmission spectra of the second plurality of optical filters. The system may also include a light redirector that optically couples the second zigzag optical path to the edge filter.

In another example embodiment, a system may include a first zigzag multiplexer or demultiplexer ("mux/demux"). The first zigzag mux/demux may be configured to spatially separate each inbound optical signal of a first plurality of inbound optical signals received at a common input of the first zigzag mux/demux onto spatially distinct outputs of the first zigzag mux/demux based on center wavelengths of the first plurality of inbound optical signals. Alternatively, the first zigzag mux/demux may be configured to spatially combine each outbound optical signal of a first plurality of outbound optical signals received at spatially distinct inputs of the first zigzag mux/demux onto a common output of the first zigzag mux/demux based on center wavelengths of the first plurality of outbound optical signals. The system may also include a second zigzag mux/demux. The second zigzag mux/demux may be configured to spatially separate each inbound optical signal of a second plurality of inbound optical signals received at a common input of the second zigzag mux/demux onto spatially distinct outputs of the second zigzag mux/demux based on center wavelengths of the second plurality of inbound optical signals. Alternatively, the second zigzag mux/demux may be configured to spatially combine each outbound optical signal of a second plurality of outbound optical signals received at spatially distinct inputs of the second zigzag mux/demux onto a common output of the second zigzag mux/demux based on center wavelengths of the second plurality of outbound optical signals. The system may also include an edge filter. The edge filter may be positioned at the common input of the first zigzag mux/demux and may be configured to redirect the first plurality of inbound optical signals and transmit the second plurality of inbound optical signals. Alternatively, the edge filter may be positioned at the common output of the first zigzag mux/demux and configured to redirect the first plurality of outbound optical signals and transmit the second plurality of outbound optical signals. The system may also include a light redirector. The light redirector may be positioned in an optical path between the edge filter and the common input of the second zigzag mux/demux. Alternatively, the light redirector may be positioned in an optical path between the edge filter and the common output of the second zigzag mux/demux.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
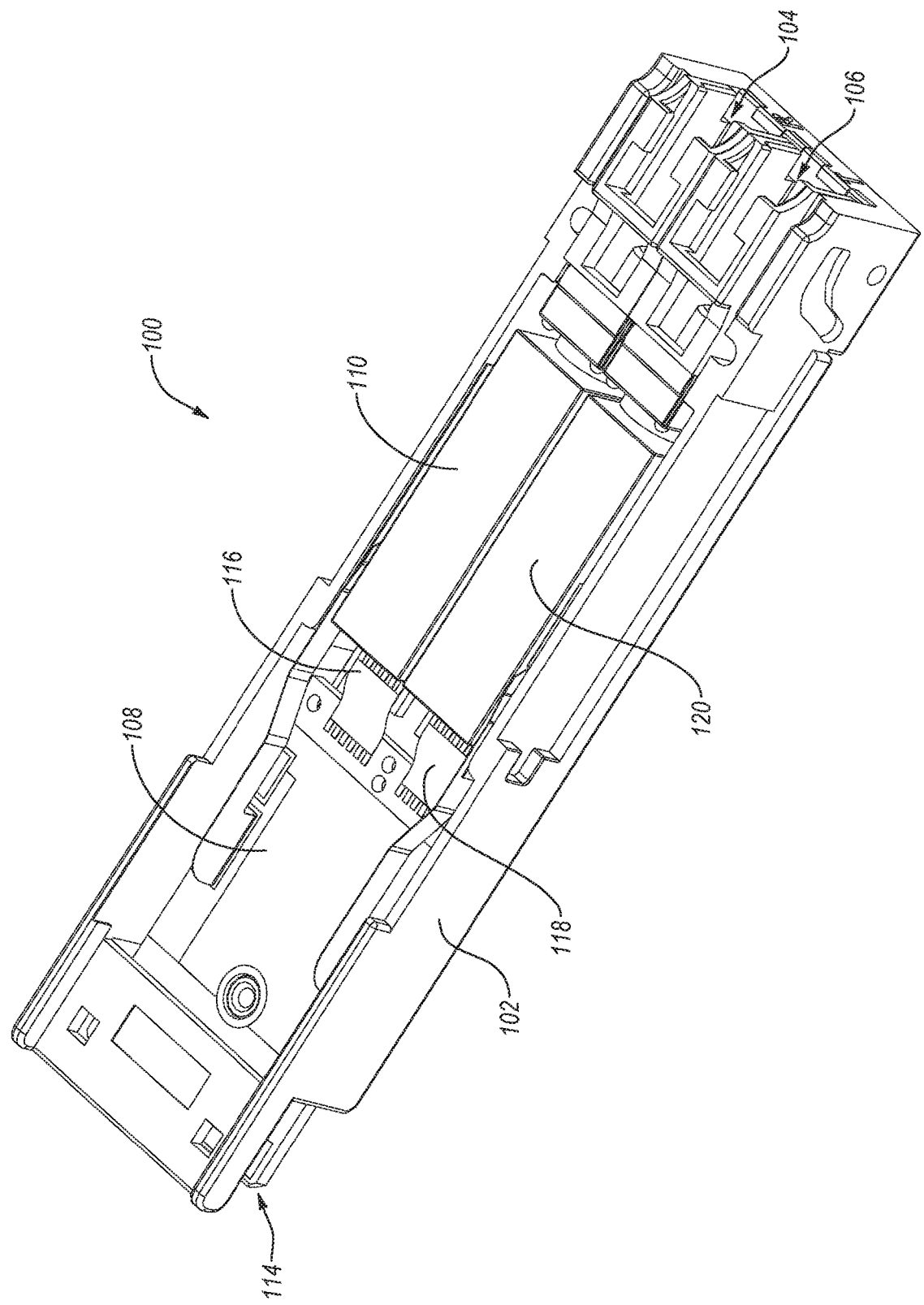
FIG. 1 illustrates a perspective view of an example optoelectronic module.

U.S. Pat. No. 8,625,989, issued Jan. 7, 2014 (hereinafter the '989 patent) and U.S. Pat. No. 9,350,454, issued May 24, 2016 (hereinafter the '454 patent), are incorporated herein by reference in their entirety.

It may be beneficial to communicate using multiple optical signals over a single optical path, for example, an optical fiber. Wavelength-division multiplexing (WDM) may include methods of combining (multiplexing) multiple optical signals having different center wavelengths from different optical paths onto a single optical path and/or separating (demultiplexing) multiple optical signals having different center wavelengths from a single optical path onto different optical paths.

Some WDM methods of demultiplexing may include separating a first optical signal propagating along a first optical path from a second optical signal propagating along the first optical path. The separating may occur at an optical filter positioned on the first optical path such that the first optical signal is transmitted through the optical filter and the second optical signal is redirected by the optical filter. The optical filter may be configured to transmit the first optical signal based on the center wavelength of the first optical signal. The optical filter may further be configured to redirect the second optical signal based on the center wavelength of the second optical signal. For example, the center wavelength of the first optical signal may be within a transmission spectrum of the optical filter while the center wavelength of the second optical signal may be within a reflectance spectrum of the optical filter. Some demultiplexers use multiple optical filters in stages to demultiplex multiple, for example eight, optical signals from a first optical path onto eight individual optical paths.

One example multi-stage demultiplexer includes two parallel surfaces that reflect a zigzag optical path therebetween. A first surface may be configured to substantially reflect light of a broad range of wavelengths. A second surface may include or be coupled to multiple optical filters. For example, the second surface may include a first optical filter configured to transmit light having a center wavelength corresponding to a first optical signal, while reflecting light having center wavelengths corresponding to a second optical signal and a third optical signal. The second surface may further include a second optical filter configured to transmit light having a center wavelength corresponding to the second optical signal, while reflecting light having a center wavelength corresponding to the third optical signal.

Multi-stage optical demultiplexers may have a drawback in that later stages may be subject to misalignment issues. For example, if the zigzag demultiplexer of the preceding example were used to demultiplex eight optical signals, and if the two surfaces of the demultiplexer were not exactly parallel, the eighth optical signal may be subject to significant misalignment. Misalignment may result in a loss of signal power which may result in a loss of data transmitted in the optical signal.

Additionally, later stages of multi-stage demultiplexers may suffer from a risk of signal degradation. For example, if the zigzag demultiplexer of the preceding example were used to demultiplex eight optical signals, and if there were irregularities in the surfaces or a medium between the surfaces of the zigzag demultiplexer, the eighth optical signal would be subject to significant risk of signal degradation based on the irregularities.

Methods and systems of the present disclosure may improve demultiplexing by separating a first group of optical signals along a common optical path into a first subset of optical signals and a second subset of optical signals. The first subset of optical signals may be directed into a first demultiplexer which may demultiplex the first subset of optical signals into individual optical signals each along a different output optical path. The second subset of optical signals may be directed into a second demultiplexer which may demultiplex the second subset of optical signals into individual optical signals each along a different output optical path.

Compared to the eight-stage zigzag demultiplexer described above, the methods and systems of the present disclosure applied to eight multiplexed optical signals may reduce the path length of the longest optical path by six passes between the surfaces of the zigzag demultiplexer. The reduced optical path length of the later stages may reduce the effects of misalignment and the risk of signal degradation in the later stages.

The systems and methods described with relation to demultiplexing may be used in reverse to multiplex. Thus, in the present disclosure, reference to "demultiplexing" may apply in reverse to multiplexing as well; and reference to "multiplexing" may apply in reverse to demultiplexing as well.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 illustrates an example optoelectronic module 100 (hereinafter "module 100"), arranged in accordance with at least one embodiment described herein. The module 100 may be configured to transmit and receive optical signals in connection with a host device (not shown). The module 100 is one environment in which example embodiments of the invention can be practiced. As disclosed in FIG. 1, the module 100 includes various components, including a bottom housing 102 configured to mate with a top housing (not shown), a receive port 104 and a transmit port 106 defined in the bottom housing 102, a printed circuit board (PCB) 108 positioned within the bottom housing 102, a ROSA 110, and a TOSA 120. An edge connector 114 is located on an end of the PCB 108 to enable the module 100 to electrically interface with a host device (not shown). As such, the PCB 108 facilitates electrical communication between the ROSA 110/TOSA 120 and the host device.

The module 100 can be configured for optical signal transmission and reception at a variety of data rates including 40 Gb/s, 100 Gb/s, or higher. Furthermore, the module 100 can be configured for optical signal transmission and reception at various distinct wavelengths using wavelength division multiplexing (WDM) in which multiple optical signals having distinct wavelengths are multiplexed onto a single optical fiber. For example, the module 100 can be configured to operate using one of various WDM schemes, such as Coarse WDM (CWDM), Dense WDM (DWDM), or Local Area Network WDM (LAN WDM). Further, the module 100 can be configured to support various communication protocols including Fibre Channel and High Speed Ethernet. In addition, although the example module 100 is configured to have a form factor that is substantially compliant with the QSFP MSA, the module 100 can alternatively be configured in a variety of different form factors that are substantially compliant with other MSAs including the CFP MSA.

With continued reference to FIG. 1, the ROSA 110 houses multiple optical receivers such as multiple PDs (not shown) that are electrically coupled to an electrical interface 116. The TOSA 120 houses multiple optical transmitters such as multiple lasers (not shown) that are electrically coupled to another electrical interface 118. Each optical receiver is configured to convert a corresponding optical signal received through the receive port 104 into a corresponding electrical signal that is relayed to the PCB 108. Each optical transmitter is configured to convert a corresponding electrical signal received through the PCB 108 from a host device (not shown) into a corresponding optical signal that is transmitted through the transmit port 106. Accordingly, the ROSA 110 serves as an optical-to-electrical transducer and the TOSA 120 serves as an electrical-to-optical transducer. The optical ports 104 and 106 are configured to optically connect the ROSA 110 and the TOSA 120, respectively, with optical fibers and corresponding optical fiber connectors such as LC or SC connectors (not shown) that connect to the optical ports 104 and 106.

The specific environment of FIG. 1 is only one of countless architectures in which example embodiments of the present invention may be employed. For example, embodiments of the multi-laser TOSA 120 can be employed in any optoelectronic transceiver, transmitter, or optical engine. Likewise, embodiments of the multi-PD ROSA 110 can be employed in any optoelectronic transceiver, receiver, or optical engine. The scope of the present invention is not intended to be limited to any particular environment.

Figure 2:
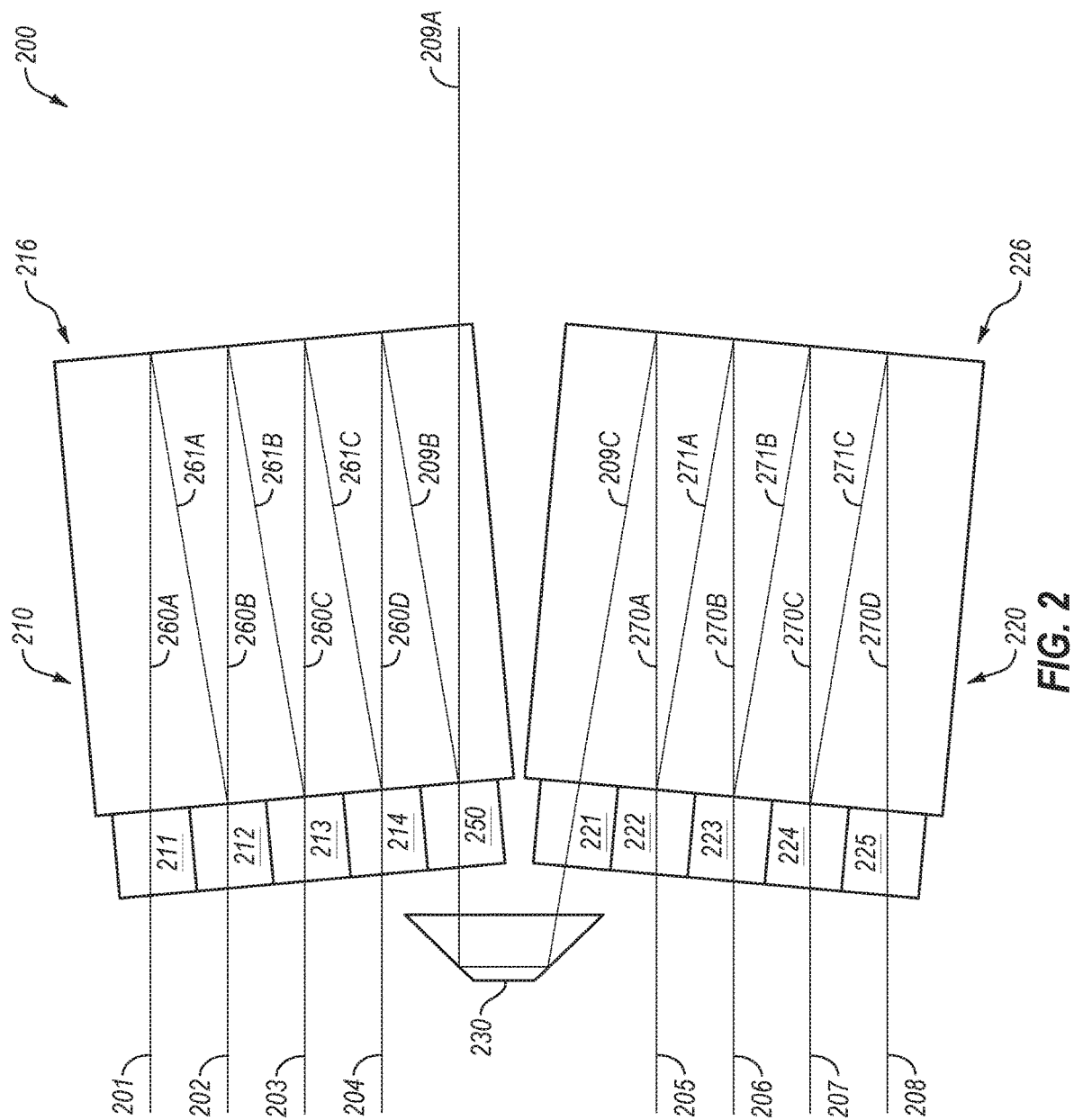
FIG. 2 illustrates an example system to multiplex or demultiplex optical signals.

FIG. 2 illustrates an example system 200 to multiplex or demultiplex multiple optical signals, arranged in accordance with at least one embodiment described herein. In some embodiments, the system 200 may include a first zigzag multiplexer or demultiplexer 210 ("first zigzag mux 210" or "first zigzag demux 210"), a second zigzag multiplexer or demultiplexer 220 ("second zigzag mux 220" or "second zigzag demux 220"), a light redirector 230, and an edge filter 250. In general, the system 200 may be configured to demultiplex an inbound combined optical signal on an inbound signal path into multiple inbound optical signals on separate optical paths or to multiplex multiple outbound optical signals on separate optical paths into an outbound combined optical signal on an outbound signal path. The inbound or outbound combined optical signal may be referred to as a "first combined optical signal 209A". The separate optical paths may include different output optical paths (in the case of demultiplexing) or different input optical paths (in the case of multiplexing) and may be referred to generally as optical paths 201-208 in FIG. 2.

In demultiplexing embodiments, the edge filter 250 may be configured to receive the first combined optical signal 209A, redirect a second combined optical signal 209B, and transmit a third combined optical signal 209C. Each of the second combined optical signal 209B and the third combined optical signal 209C may be a subset of the first combined optical signal 209A. In some embodiments, the first combined optical signal 209A may include eight optical signals, each having a different center wavelength. The second combined optical signal 209B may include four of the eight optical signals, and the third combined optical signal 209C may include the remaining four of the eight optical signals. The eight optical signals of the first combined optical signal 209A may have been multiplexed into the first combined optical signal 209A using any suitable method, device, and/or system, including a system such as the system 200 in reverse.

In multiplexing embodiments, the edge filter 250 may be configured to receive the second combined optical signal 209B and the third combined optical signal 209C. The edge filter 250 may spatially combine the second combined optical signal 209B with the third combined optical signal 209C to form the first combined optical signal 209A. For example, the edge filter 250 may pass the third combined optical signal 209C and reflect or otherwise redirect the second combined optical signal 209B into the same optical path as the third combined optical signal 209C such that together they propagate along the same optical path as the first combined optical signal 209A. In this and other embodiments, the second combined optical signal 209B may include four optical signals (each having a different center wavelength), the third combined optical signal 209C may include four optical signals (each having a different center wavelength), and the first combined optical signal 209A may include all eight optical signals (each having a different center wavelength).

In some embodiments, the edge filter 250 may be configured to substantially redirect the second combined optical signal 209B based on the center wavelengths of the optical signals of the second combined optical signal 209B. For example, the edge filter 250 may have a reflectance spectrum that includes the center wavelengths of each optical signal of the second combined optical signal 209B. For example, the edge filter 250 may include multiple layers configured to substantially redirect light having a wavelength greater than a threshold wavelength (or equivalently having a frequency less than a threshold frequency). Each of the optical signals of the second combined optical signal 209B may have a center wavelength greater than the threshold wavelength (or equivalently may have a center frequency less than the threshold frequency).

In some embodiments, the edge filter 250 may be configured to substantially transmit the third combined optical signal 209C based on the center wavelengths of the optical signals of the third combined optical signal 209C. For example, the edge filter 250 may have a transmission spectrum that includes the center wavelengths of each optical signal of the third combined optical signal 209C. For example, the edge filter 250 may include multiple layers configured to substantially transmit light having a wavelength less than the threshold wavelength (or equivalently having a center frequency greater than the threshold frequency). Each of the optical signals of the third combined optical signal 209C may have a center wavelength less than the threshold wavelength (or equivalently may have a center frequency greater than the threshold frequency). As described, the edge filter 250 may include a high-pass filter (HPF).

Alternatively or additionally, the edge filter 250 may include a low-pass filter (LPF) if configured to redirect light having a wavelength less than the threshold wavelength (or having a frequency greater than the threshold frequency) and if configured to transmit light having a wavelength greater than the threshold wavelength (or having a frequency less than the threshold frequency).

Additionally or alternatively, the edge filter 250 may include a bandpass optical filter such that the edge filter 250 is configured to transmit light having wavelengths within a passband while redirecting light having wavelengths outside the passband. In these and other embodiments, the passband may include the center wavelengths of the optical signals of the third combined optical signal 209C while excluding the center wavelengths of the optical signals of the second combined optical signal 209B.

In some embodiments, the edge filter 250 may be positioned relative to the first zigzag demux 210 such that the edge filter 250 may redirect the second combined optical signal 209B into the first zigzag demux 210.

In some embodiments, the light redirector 230 may be positioned relative to the edge filter 250 and the second zigzag demux 220 such that it redirects the third combined optical signal 209C transmitted through the edge filter 250 into the second zigzag demux 220. The light redirector 230 may include any suitable means of redirecting light, for example, a prism and/or one or more reflective surfaces.

In some embodiments, the first zigzag demux 210 may include a first optical filter 211, a second optical filter 212, a third optical filter 213, a fourth optical filter 214, and a first reflecting surface 216. The first zigzag demux 210 may include a glass block or prism. The first zigzag demux 210 may include a first optical path including multiple first segments 260A-260D (hereinafter collectively "first segments 260") and multiple second segments 261A-261C (hereinafter collectively "second segments 261").

As an example of the operation of the first zigzag demux 210, the second combined optical signal 209B may enter the first zigzag demux 210 after being redirected at the edge filter 250. The second combined optical signal 209B may be redirected, e.g., reflected, at the first reflecting surface 216. The second combined optical signal 209B may proceed along a fourth one of the first segments 260, e.g., along first segment 260D, to the fourth optical filter 214. At the fourth optical filter 214, a fourth optical signal of the second combined optical signal 209B may be transmitted while the remaining optical signals of the second combined optical signal 209B may be redirected along a third one of the second segments 261, e.g., along second segment 261C.

Then, the remaining optical signals of the second combined optical signal 209B may be redirected at the first reflecting surface 216. The remaining optical signals of the second combined optical signal 209B may proceed along a third one of the first segments 260, e.g., along first segment 260C, to the third optical filter 213. At the third optical filter 213, a third optical signal of the second combined optical signal 209B may be transmitted while the remaining optical signals of the second combined optical signal 209B may be redirected along a second one of the second segments 261, e.g., along second segment 261B.

Then, the remaining optical signals of the second combined optical signal 209B may be redirected at the first reflecting surface 216. The remaining optical signals of the second combined optical signal 209B may proceed along a second one of the first segments 260, e.g., along first segment 260B, to the second optical filter 212. At the second optical filter 212, a second optical signal of the second combined optical signal 209B may be transmitted while the remaining optical signal of the second combined optical signal 209B may be redirected along a first one of the second segments 261, e.g., along second segment 261A.

Then, the remaining optical signal of the second combined optical signal 209B may be redirected at the first reflecting surface 216. The remaining optical signal of the second combined optical signal 209B may proceed along a first one of the first segments 260, e.g., along first segment 260A, to the first optical filter 211. At the first optical filter 211, the remaining optical signal of the second combined optical signal 209B, e.g., a first optical signal of the second combined optical signal 209B, may be transmitted. The first optical filter 211 may be configured to redirect other light.

In some embodiments, the second zigzag demux 220 may include a fifth optical filter 221, a sixth optical filter 222, a seventh optical filter 223, an eighth optical filter 224, a ninth optical filter 225, and a second reflecting surface 226. The second zigzag demux 220 may include a glass block or prism. The second zigzag demux 220 may include a second optical path including multiple third segments 270A-270D (hereinafter collectively "third segments 270") and multiple fourth segments 271A-271C (hereinafter collectively "fourth segments 271"). The operation of the second zigzag demux 220 may be substantially similar to the example given above with relation to the operation of the first zigzag demux 210.

In some embodiments, the optical filters 211-214, and the optical filters 221-225 may include highpass filters, lowpass filters, or bandpass filters. Each of the optical filters 211-214 and each of the optical filters 222-225 may be configured to transmit light having a center wavelength corresponding to a center wavelength of one of the optical signals of the first combined optical signals 209A. For example, each of the optical filters 211-214 may have a transmission spectrum that includes a center wavelength of a corresponding one of the optical signals of the second combined optical signal 209B. Likewise, each of the optical filters 222-225 may have a transmission spectrum that includes a center wavelength of a corresponding one of the optical signals of the third combined optical signal 209C. In some embodiments, the first optical filter 211, the fifth optical filter 221, and/or the ninth optical filter 225 may be configured to transmit light of two or more wavelengths. In these or other embodiments, the first optical filter 211, the fifth optical filter 221, and/or the ninth optical filter 225 may be omitted.

In some embodiments, the system 200 may be used as a multiplexer. The operation of the system 200 as a multiplexer may be substantially the reverse of the operation described above with regard to demultiplexing. For example, a first four optical signals may be received along the four optical paths 201-204. Each of the optical filters 211-214 may transmit one of the first four optical signals into the first zigzag mux 210, where the first four optical signals may be combined into the second combined optical signal 209B. A second four optical signals may be received along the four optical paths 205-208. Each of the optical filters 222-225 may transmit one of the second four optical signals into the second zigzag mux 220, where the second four optical signals may be combined into the third combined optical signal 209C. The edge filter 250 may be configured to receive the second combined optical signal 209B from the first zigzag mux 210 and redirect the second combined optical signal 209B onto an outbound optical path. The light redirector 230 may be configured to receive the third combined optical signal 209C from the second zigzag mux 220 and redirect the third combined optical signal 209C on to the outbound optical path. The edge filter 250 may be configured to transmit the third combined optical signal 209C.

Modifications, additions, or omissions may be made to the system 200 without departing from the scope of the present disclosure. For example, though illustrated with eight optical signals, and eight different optical paths 201-208, the system 200 may include any number of optical signals and any number of different optical paths. In these or other embodiments, the system of the present disclosure may include more or fewer zigzag demuxes, edge filters, light redirectors, and/or optical filters. For example, the system of the present disclosure may include three edge filters that may be configured to demultiplex sixteen optical signals on one optical path into four groups of four optical signals, each of the groups of optical signals on an optical path. The example system may further include four zigzag demuxes, each configured to demulitplex a different one of the four optical groups of optical signals into individual optical signals on different optical paths.

Figure 3:
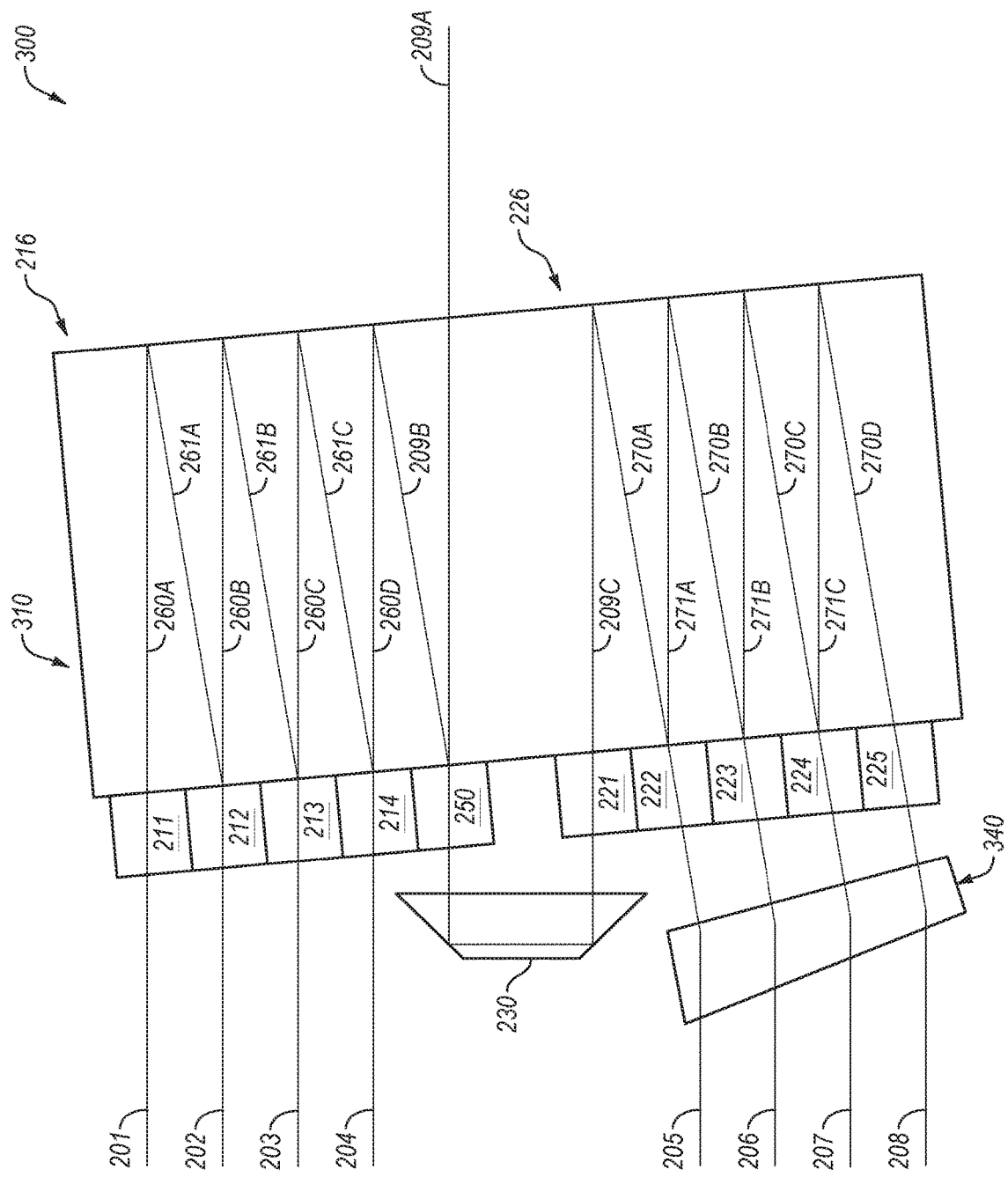
FIG. 3 illustrates another example system to multiplex or demultiplex optical signals.

FIG. 3 illustrates another example system 300 to multiplex or demultiplex multiple optical signals, arranged in accordance with at least one embodiment described herein. As illustrated, the system 300 may include at least some components that are similar to or the same as those described with respect to the system 200. Such components are indicated with the same component numbering as used in FIG. 2 to describe the system 200. As illustrated, a zigzag demux 310 ("zigzag mux 310" or "zigzag demux 310") may be implemented in the system 300 rather than the first zigzag demux 210 and the second zigzag demux 220 of the system 200. Additionally, the system 300 may also include a second light redirector 340.

The zigzag demux 310 may include the first optical filter 211, the second optical filter 212, the third optical filter 213, the fourth optical filter 214, the fifth optical filter 221, the sixth optical filter 222, the seventh optical filter 223, the eighth optical filter 224, the ninth optical filter 225, the first reflecting surface 216, and the second reflecting surface 226. As illustrated, the first reflecting surface 216 and the second reflecting surface 226 may denote different portions or regions of a single surface of the zigzag demux 310. The zigzag demux 310 may include a single glass block or prism. The zigzag demux 310 may include a first optical path including the multiple first segments 260A-260D and the multiple second segments 261A-261C. The zigzag demux 310 may include a second optical path including the multiple third segments 270A-270D and the multiple fourth segments 271A-271C.

In some embodiments, in the case of methods and systems to demultiplex, optical paths 205-208 exiting the sixth optical filter 222, the seventh optical filter 223, the eighth optical filter 224, and the ninth optical filter 225 may be substantially parallel to the third segments 270A-270D. The second light redirector 340 may be configured to redirect the optical paths 205-208 such that the optical paths 205-208, after redirection, are substantially parallel to the optical paths 201-204, which may be parallel to the fourth segments 271A-271C. Redirecting the optical paths 205-208 such that they are parallel to the optical paths 201-204 may be important to other optical components, for example multiple PDs arranged in a ROSA. The second light redirector 340 may include any suitable means of redirecting light, for example, a prism.

In some embodiments, in the case of methods and systems to multiplex, optical paths 205-208 entering the sixth optical filter 222, the seventh optical filter 223, the eighth optical filter 224, and the ninth optical filter 225 may be substantially parallel to the optical paths 201-204. This may be because the optical paths 201-208 may have been propagated from elements arranged in parallel, for example, multiple lasers arranged in a TOSA. The second light redirector 340 may be configured to redirect the optical paths 205-208 such that the optical paths 205-208, after redirection and reflection at the second reflecting surface 226, are substantially parallel to the optical paths 201-204, which may be parallel to the fourth segments 271A-271C.

Similar to the system 200, the system 300 may be used to multiplex or demultiplex optical signals. And, similar to the system 200, modifications, additions, or omissions may be made to the system 300 without departing from the scope of the present disclosure.

Figure 4:
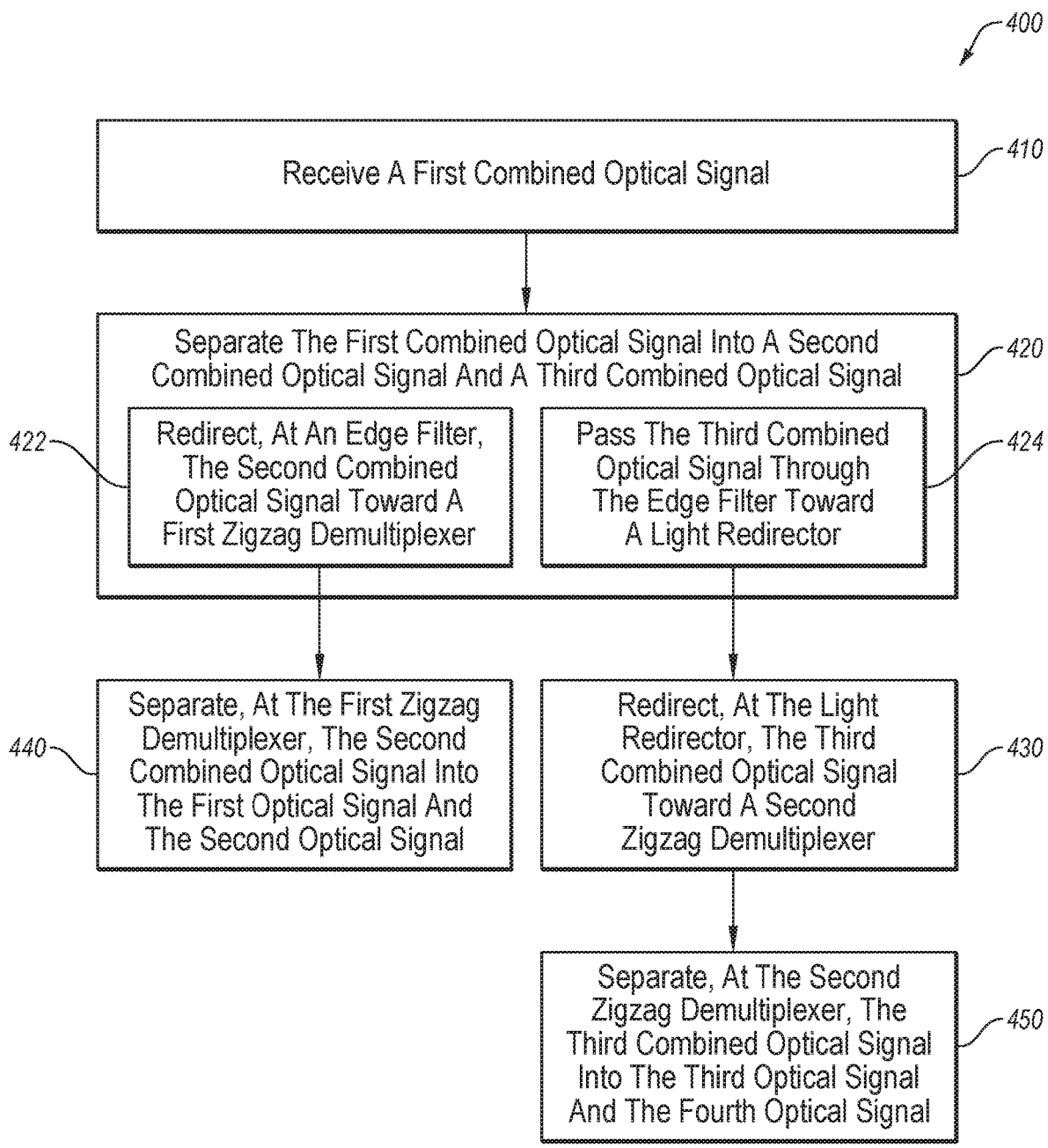
FIG. 4 is a flow chart of an example method to demultiplex optical signals.

FIG. 4 is a flow chart of an example method 400 to demultiplex multiple optical signals, arranged in accordance with at least one embodiment described herein. In some embodiments, one or more of the operations associated with the method 400 may be performed by a portion or all of one or more of the module 100, the system 200, and/or the system 300 of FIGS. 1-3. Although illustrated with discrete blocks, the steps and operations associated with one or more of the blocks of the method 400 may be divided into additional blocks, combined into fewer blocks, or eliminated, depending on the desired implementation. In general, the method 400 may include spatially separating a first combined optical signal into four (or more) optical signals on different optical paths.

At block 410, the first combined optical signal may be received at an edge filter. The first combined optical signal may include a first optical signal having a first center wavelength, a second optical signal having a second center wavelength, a third optical signal having a third center wavelength, and a fourth optical signal having a fourth center wavelength. For example, the first combined optical signal 209A of FIGS. 2 and 3 may be received at the edge filter 250 of FIGS. 2 and 3 at block 410. The block 410 may be followed by block 420.

At the block 420, the first combined optical signal may be separated into a second combined optical signal and a third combined optical signal, at the edge filter, based on wavelength. The second combined optical signal may include the first optical signal and the second optical signal. The third combined optical signal may include the third optical signal and the fourth optical signal. For example, at the block 420, the first combined optical signal 209A may be separated into the second combined optical signal 209B of FIGS. 2 and 3 and the third combined optical signal 209C of FIGS. 2 and 3 at the edge filter 250.

The block 420 may include block 422, which may be a step in the block 420. At the block 422, the second combined optical signal may be redirected toward a first zigzag demultiplexer. The second combined optical signal may be redirected based on the first center wavelength and the second center wavelength. For example, the edge filter may be configured to redirect light having wavelengths including the first center wavelength and the second center wavelength. For example, the second combined optical signal 209B may be redirected toward the first zigzag mux 210 of FIG. 2 or the zigzag mux 310 of FIG. 3 at the edge filter 250 at the block 422. The block 422 may be followed by block 440.

The block 420 may also include block 424, which may be a step in the block 420. At the block 424, the third combined optical signal may be passed through the edge filter toward a light redirector. The third combined optical signal may be passed through the edge filter based on the third center wavelength and the fourth center wavelength. For example, the edge filter may be configured to pass light having wavelengths including the third center wavelength and the fourth center wavelength. For example, the third combined optical signal 209C may pass through the edge filter 250 toward the light redirector 230 of FIGS. 2 and 3 at the block 424. The block 424 may be followed by block 430.

At the block 430, the third combined optical signal may be redirected at the light redirector toward a second zigzag demultiplexer. For example, the third combined optical signal 209C may be redirected at the light redirector 230 toward the second zigzag demux 220 of FIG. 2 or the zigzag demux 310 of FIG. 3 at block 430. The block 430 may be followed by block 450.

At the block 440, the second combined optical signal may be separated, at the first zigzag demultiplexer, into the first optical signal on a first optical path and the second optical signal on a second optical path. The second combined optical signal may be separated into the first optical signal and the second optical signal based on the first center wavelength and the second center wavelength. For example, the first zigzag demultiplexer may be configured to spatially separate the first optical signal from the second optical signal based on the first center wavelength and the second center wavelength. The first zigzag demultiplexer may include a second optical filter configured to transmit the second optical signal based on the second center wavelength and redirect the first optical signal based on the first center wavelength, or vice versa. For example, at the block 440, the second combined optical signal 209B may be separated, at the first zigzag demux 210 or the demux 310, into the first optical signal on the optical path 201 of FIGS. 2 and 3 and the second optical signal on the optical path 202 of FIGS. 2 and 3. The first zigzag demux 210 or the zigzag demux 310 may include the second optical filter 212 which may be configured to transmit the second optical signal along the optical path 202 and redirect the first optical signal toward the first reflecting surface 216. The first reflecting surface 216 may be configured to redirect the first optical signal along the optical path 201.

At the block 450, the third combined optical signal may be separated, at the second zigzag demultiplexer, into the third optical signal on a third optical path and the fourth optical signal on a fourth optical path. The third combined optical signal may be separated into the third optical signal and the fourth optical signal based on the third center wavelength and the fourth center wavelength. For example, the second zigzag demultiplexer may be configured to spatially separate the third optical signal from the fourth optical signal based on the third center wavelength and the fourth center wavelength. The second zigzag demultiplexer may include a third optical filter configured to transmit the third optical signal based on the third center wavelength and redirect the fourth optical signal based on the fourth center wavelength, or vice versa. For example, at block 450, the third combined optical signal 209C may be separated, at the second zigzag demux 220 or the zigzag demux 310, into the third optical signal on the optical path 207 of FIGS. 2 and 3 and the fourth optical signal on the optical path 208 of FIGS. 2 and 3. The second zigzag demux 220 or the zigzag demux 310 may include the eighth optical filter 224 which may be configured to transmit the third optical signal along the optical path 207 and redirect the fourth optical signal toward the second reflecting surface 226. The second reflecting surface 226 may be configured to redirect the fourth optical signal along the optical path 208.

In some embodiments, the method 400 may additionally include redirecting the third optical signal on the third optical path and the fourth optical signal on the fourth optical path such that the third optical signal on the third optical path may be substantially parallel to the first optical signal on the first optical path. For example, the third optical signal on the optical path 207 may be redirected at the second light redirector 340 of FIG. 3.

Modifications, additions, or omissions may be made to the method 400 without departing from the scope of the present disclosure. For example, the first zigzag demultiplexer and the second zigzag demultiplexer may be included in a single zigzag demultiplexer, such as the zigzag demux 310 of FIG. 3. Further, the order of operations may vary according to different implementations. Alternatively or additionally, two or more of the blocks of the method 400 may occur at substantially the same time.

Figure 5:
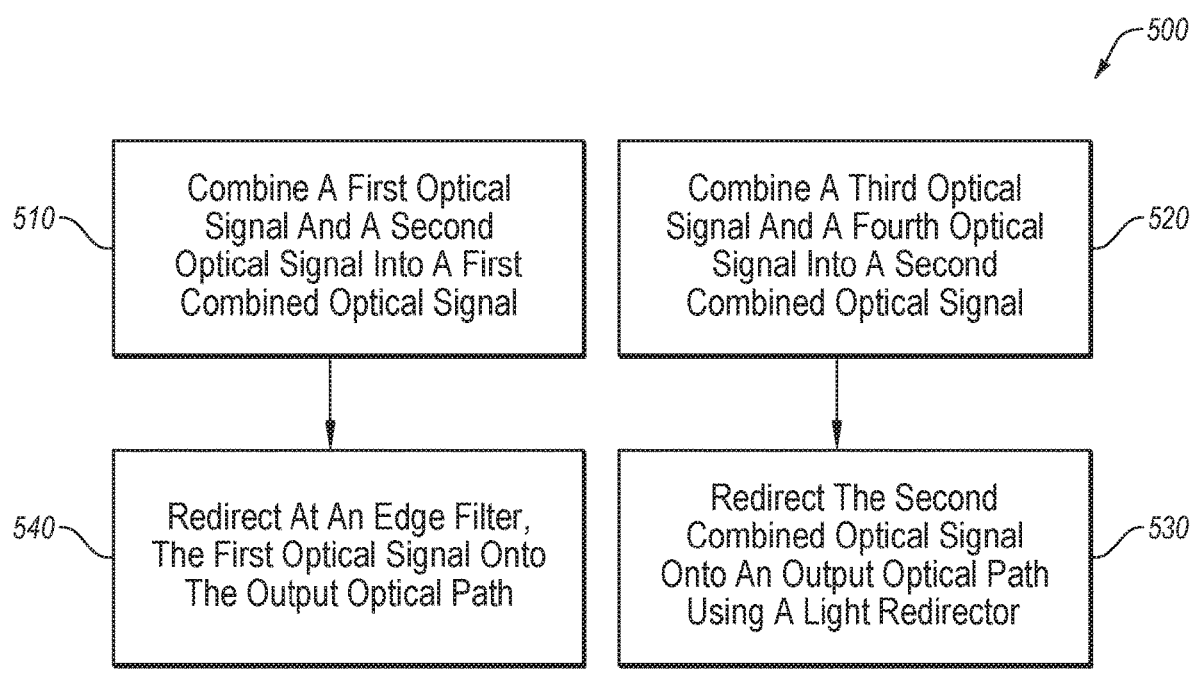
FIG. 5 is a flow chart of an example method to multiplex optical signals, all arranged in accordance with at least one embodiment described herein.

FIG. 5 is a flow chart of an example method 500 to multiplex multiple optical signals, arranged in accordance with at least one embodiment described herein. In some embodiments, one or more of the operations associated with the method 500 may be performed by a portion or all of one or more of the module 100, the system 200, and/or the system 300 of FIGS. 1-3. Although illustrated with discrete blocks, the steps and operations associated with one or more of the blocks of the method 500 may be divided into additional blocks, combined into fewer blocks, or eliminated, depending on the desired implementation. In general, the method 500 may include combining four optical signals onto an output optical path.

At block 510, a first optical signal and a second optical signal may be combined into a first combined optical signal at a first zigzag multiplexer. The first optical signal may have a first center wavelength, and the second optical signal may have a second center wavelength. The first optical signal and the second optical signal may be combined based on the first center wavelength and the second center wavelength. For example, the first zigzag multiplexer may be configured to combine the first optical signal with the second optical signal based on the first center wavelength and the second center wavelength. The first optical multiplexer may include a second optical filter configured to redirect the first optical signal based on the first center wavelength and to transmit the second optical signal based on the second center wavelength, or vice versa. For example, at the block 510, the first optical signal that initially propagates along the optical path 201 of FIGS. 2 and 3 may be combined with the second optical signal that initially propagates along the optical path 202 of FIGS. 2 and 3 at the first zigzag mux 210 of FIG. 2 or the zigzag mux 310 of FIG. 3. The first zigzag demux 210 or the zigzag demux 310 may include the first reflecting surface 216 which may be configured to redirect the first optical signal toward the second optical filter 212. The second optical filter 212 may be configured to redirect the first optical signal and transmit the second optical signal. Both the redirected first optical signal and the transmitted second optical signal may propagate on the second one of the first segments 260, e.g., on the first segment 260B, toward the first reflecting surface 216 and ultimately out of the first zigzag demux 210 or the zigzag demux 310, e.g., as the second combined optical signal 209B of FIGS. 2 and 3. Block 510 may be followed by block 540.

At block 520, a third optical signal and a fourth optical signal may be combined into a second combined optical signal at a second zigzag multiplexer. The third optical signal may have a third center wavelength, and the fourth optical signal may have a fourth center wavelength. The third optical signal and the fourth optical signal may be combined based on the third center wavelength and the fourth center wavelength. For example, the second zigzag multiplexer may be configured to combine the third optical signal with the fourth optical signal based on the third center wavelength and the fourth center wavelength. The second optical multiplexer may include a third optical filter configured to redirect the fourth optical signal based on the fourth center wavelength and to transmit the third optical signal based on the third center wavelength, or vice versa. For example, at the block 520, the third optical signal that initially propagates along the optical path 207 of FIGS. 2 and 3 may be combined with the fourth optical signal that initially propagates along the optical path 208 of FIGS. 2 and 3 at the first zigzag mux 210 of FIG. 2 or the zigzag mux 310 of FIG. 3. The second zigzag demux 220 or the zigzag demux 310 may include the second reflecting surface 226 which may be configured to redirect the fourth optical signal toward the eighth optical filter 224. The eighth optical filter 224 may be configured to redirect the fourth optical signal and transmit the third optical signal. Both the redirected fourth optical signal and the transmitted third optical signal may propagate on a third one of the third segments 270, e.g., on third segment 270C toward the second reflecting surface 226 and ultimately out of the second zigzag demux 220 or the zigzag demux 310, e.g., as the third combined optical signal 209C of FIGS. 2 and 3. The block 520 may be followed by block 530.

At the block 530, the second combined optical signal may be redirected onto an output optical path using a light redirector. The second combined optical signal may be passed through an edge filter based on the third center wavelength and the fourth center wavelength. For example, the edge filter may be configured to transmit light having wavelengths including the third center wavelength and the fourth center wavelength. For example, at the block 530, the third combined optical signal 209C may be redirected onto the output optical path using the light redirector 230 of FIGS. 2 and 3.

At the block 540, the first combined optical signal may be redirected onto the output optical path at the edge filter. The first combined optical signal may be redirected based on the first center wavelength and the second center wavelength. For example, the edge filter may be configured to redirect light having wavelengths including the first center wavelength and the second center wavelength. For example, at the block 540, the second combined optical signal 209B may be redirected at the edge filter 250 of FIGS. 2 and 3.

The method 500 may additionally include redirecting the third optical signal on the third optical path and the fourth optical signal on the fourth optical path prior to block 520. The third optical signal on the third optical path and the fourth optical signal on the fourth optical path may be redirected such that, after the redirection and a subsequent redirection at a reflecting surface of the second zigzag multiplexer, the third optical signal on the third optical path and the fourth optical signal on the fourth optical path are substantially parallel to the third optical signal on the third optical path and the fourth optical signal on the fourth optical path prior to redirection. For example, the third optical signal on the optical path 207 may be redirected at the second light redirector 340 of FIG. 3, then subsequently redirected at the second reflecting surface 226 of FIG. 3. The result may be that the fourth segments 271 may be substantially parallel to the optical path 207 prior to entering the second light redirector 340.

Similar to the method 400 of FIG. 4, modifications, additions, or omissions may be made to the method 500 without departing from the scope of the present disclosure. For example, the first zigzag multiplexer and the second zigzag multiplexer may be included in a single zigzag multiplexer, such as the zigzag mux 310 of FIG. 3. Further, the order of operations may vary according to different implementations. Alternatively or additionally, two or more of the blocks of the method 500 may occur at substantially the same time.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   passing a first combined optical signal through a first zigzag demultiplexer from a first reflecting surface to an opposite surface that is spaced apart from and parallel to the first reflecting surface, the first combined optical signal including a first optical signal having a first center wavelength, a second optical signal having a second center wavelength, a third optical signal having a third center wavelength, and a fourth optical signal having a fourth center wavelength;
   receiving, at an edge filter attached to the opposite surface of the first zigzag demultiplexer, the first combined optical signal;
   separating, at the edge filter, the first combined optical signal into a second combined optical signal and a third combined optical signal based on wavelength, wherein the second combined optical signal includes the first optical signal and the second optical signal, and the third combined optical signal includes the third optical signal and the fourth optical signal, wherein the separating includes:
   redirecting, at the edge filter, the second combined optical signal toward the first reflecting surface of the first zigzag demultiplexer; and
   passing the third combined optical signal through the edge filter toward a light redirector,
   redirecting, at the light redirector, the third combined optical signal toward a second zigzag demultiplexer, including redirecting the third combined optical signal in plane with the second combined optical signal and toward a second reflecting surface of the second zigzag demultiplexer;
   separating, at the first zigzag demultiplexer, the second combined optical signal into the first optical signal on a first optical path and the second optical signal on a second optical path based on the first center wavelength and the second center wavelength, including separating the second combined optical signal into the first optical signal and the second optical signal at an optical filter coupled linearly with the edge filter to the opposite surface of the first zigzag demultiplexer; and
   separating, at the second zigzag demultiplexer, the third combined optical signal into the third optical signal on a third optical path and the fourth optical signal on a fourth optical path based on the third center wavelength and the fourth center wavelength, including separating the third combined optical signal into the third optical signal and the fourth optical signal at an optical filter coupled to a surface of the second zigzag demultiplexer that is parallel to and spaced apart from the second reflecting surface.

2. The method of claim 1, further comprising redirecting the third optical signal on the third optical path such that the redirected third optical signal on the third optical path is parallel to the first optical signal on the first optical path.

3. The method of claim 1, wherein:
   the first center wavelength is shorter than the second center wavelength,
   the second center wavelength is shorter than the third center wavelength,
   the third center wavelength is shorter than the fourth center wavelength,
   the edge filter is configured to substantially redirect light having wavelengths shorter than a threshold wavelength and substantially transmit light having wavelengths longer than the threshold wavelength, and
   the threshold wavelength is between the second center wavelength and the third center wavelength.

4. A method comprising:
   combining, at a first zigzag multiplexer that includes a first glass block or prism, a first optical signal having a first center wavelength and a second optical signal having a second center wavelength into a first combined optical signal based on the first center wavelength and the second center wavelength, including combining the first optical signal and the second optical signal into the first combined optical signal at an optical filter coupled to a surface of the first glass block or prism that is parallel to and spaced apart from a first reflecting surface of the first glass block or prism;

combining, at a second zigzag multiplexer that includes a second glass block or prism that is positioned side by side and coplanar with the first glass block or prism, a third optical signal having a third center wavelength and a fourth optical signal having a fourth center wavelength into a second combined optical signal based on the third center wavelength and the fourth center wavelength, including combining the third optical signal and the fourth optical signal into the second combined optical signal at an optical filter coupled to a surface of the second glass block or prism that is parallel to and spaced apart from a second reflecting surface of the second glass block or prism;

redirecting the second combined optical signal onto an output optical path using a light redirector; and redirecting, at an edge filter coupled linearly with the optical filter to the surface of the first glass block or prism that is parallel to and spaced apart from the first reflecting surface, the first combined optical signal onto the output optical path based on the first center wavelength and the second center wavelength; and further comprising prior to the combining of the third optical signal and the fourth optical signal, redirecting the third optical signal and the fourth optical signal using a second light redirector such that the third optical signal and the fourth optical signal, after being redirected at the second reflecting surface of the second glass block or prism, are parallel to the third optical signal and the fourth optical signal prior to being redirected by the second light redirector.

5. The method of claim 4, wherein:
the first center wavelength is shorter than the second center wavelength,
the second center wavelength is shorter than the third center wavelength,
the third center wavelength is shorter than the fourth center wavelength,
the edge filter is configured to substantially redirect light having wavelengths shorter than a threshold wavelength and substantially transmit light having wavelengths longer than the threshold wavelength, and
the threshold wavelength is between the second center wavelength and the third center wavelength.

6. A system comprising:
a first zigzag multiplexer or demultiplexer ("mux/demux"), wherein:
the first zigzag mux/demux includes a first zigzag optical path;
the first zigzag optical path includes multiple first segments and multiple second segments;
the first segments are parallel to and spaced apart from each other;
the second segments are parallel to and spaced apart from each other;
the second segments are arranged at an angle to the first segments;
each of the second segments is optically coupled between opposite ends of a corresponding pair of adjacent first segments such that one end of each second segment is optically coupled to a filter end of a first corresponding first segment in the corresponding pair and an opposite end of each second segment is optically coupled to a reflection end of a second corresponding first segment in the corresponding pair;
the reflection end of each first segment terminates at a first reflection surface of the first zigzag mux/demux; and
the filter end of each first segment terminates at a surface of the first zigzag mux-demux that is spaced apart from and parallel to the first reflection surface;
a first plurality of optical filters coupled to the surface of the first zigzag mux/demux that is spaced apart from and parallel to the first reflection surface, wherein a different one of the first plurality of optical filters is coupled to the surface of the first zigzag mux/demux in optical communication with the first zigzag optical path at each of multiple filter vertices in the first zigzag optical path formed where one end of a corresponding second segment is optically coupled to the filter end of a corresponding first segment;
a second zigzag multiplexer or demultiplexer ("mux/demux"), wherein:
the second zigzag mux/demux includes a second zigzag optical path, wherein the first zigzag optical path of the first zigzag mux/demux and the second zigzag optical path of the second zigzag mux/demux are coplanar;
the second zigzag optical path includes multiple third segments and multiple fourth segments;
the third segments are parallel to and spaced apart from each other;
the fourth segments are parallel to and spaced apart from each other;
the fourth segments are arranged at an angle to the third segments;
each of the fourth segments is optically coupled between opposite ends of a corresponding pair of adjacent third segments such that one end of each fourth segment is optically coupled to a filter end of a first corresponding third segment in the corresponding pair and an opposite end of each fourth segment is optically coupled to a reflection end of a second corresponding third segment in the corresponding pair;
the reflection end of each third segment terminates at a second reflection surface of the second zigzag mux/demux; and
the filter end of each third segment terminates at a surface of the second zigzag mux-demux that is spaced apart from and parallel to the second reflection surface;
a second plurality of optical filters coupled to the surface of the second zigzag mux/demux that is spaced apart from and parallel to the second reflection surface, wherein a different one of the second plurality of optical filters is coupled to the surface of the second zigzag mux/demux in optical communication with the second zigzag optical path at each of multiple filter vertices in the second zigzag optical path formed where one end of a corresponding fourth segment is optically coupled to the filter end of a corresponding third segment;
an edge filter coupled to the surface of the first zigzag mux/demux that is spaced apart from and parallel to the first reflection surface, the edge filter in optical communication with a first or last filter vertex of the first zigzag optical path, wherein the edge filter has a reflectance spectrum that includes center wavelengths of transmission spectra of the first plurality of optical filters and that has a transmission spectrum that includes center wavelengths of transmission spectra of the second plurality of optical filters; and a light redirector that optically couples the second zigzag optical path to the edge filter;

wherein the first zigzag mux/demux and the second zigzag mux/demux are both formed in a common prism and wherein the first and second reflection surfaces comprise different portions of a single planar surface of the common prism.

7. The system of claim 6, further comprising a second light redirector:

optically coupled to outputs of the second plurality of optical filters when the second zigzag multiplexer or demultiplexer comprises a second zigzag demultiplexer; or optically coupled to inputs of the second plurality of optical filters when the second zigzag multiplexer or demultiplexer comprises a second zigzag multiplexer.

8. The system of claim 6, wherein the first plurality of optical filters comprises:

a first bandpass optical filter configured to substantially transmit light having wavelengths within a first passband and substantially redirect light having wavelengths outside the first passband; and a second bandpass optical filter configured to substantially transmit light having wavelengths within a second passband and substantially redirect light having wavelengths outside the second passband; and wherein the first passband does not substantially overlap with the second passband.

9. The system of claim 6, wherein the first plurality of optical filters comprises:

a first edge filter configured to substantially transmit light having wavelengths less than a first threshold wavelength and substantially redirect light having wavelengths greater than the first threshold wavelength; and a second edge filter configured to substantially transmit light having wavelengths less than a second threshold wavelength and substantially redirect light having wavelengths greater than the second threshold wavelength.

10. A system comprising:

a first zigzag multiplexer or demultiplexer ("mux/demux") that includes:
  a first glass block or prism having a first reflection surface and an opposite surface that is spaced apart from and parallel to the first reflection surface;
  a first plurality of optical filters coupled linearly to the opposite surface of the first glass block or prism; and
  one of:
    a first plurality of input optical paths, including one input optical path each that passes through a corresponding one of the first plurality of optical filters to the first glass block or prism; or
    a first plurality of output optical paths, including one output optical path each that passes from the first glass block or prism through a corresponding one of the first plurality of optical filters;

a second zigzag mux/demux that includes:
  a second glass block or prism having a second reflection surface and an opposite surface that is spaced apart from and parallel to the second reflection surface;
  a second plurality of optical filters coupled linearly to the opposite surface of the second glass block or prism; and
  one of:
    a second plurality of input optical paths, including one input optical path each that passes through a corresponding one of the second plurality of optical filters to the second glass block or prism; or
    a second plurality of output optical paths, including one output optical path each that passes from the second glass block or prism through a corresponding one of the second plurality of optical filters;

an edge filter coupled to the opposite surface of the first glass block or prism linearly with e first plurality of optical filters;

an output/input optical path that passes through the first glass block or prism, wherein one of:
  the output/input optical path is a common output optical path optically coupled to a common output optical path of the first zigzag mux/demux and a common output optical path of the second zigzag mux/demux; or
  the output/input optical path is a common input optical path optically coupled to a common input optical path of the first zigzag mux/demux and a common input optical path of the second zigzag mux/demux; and a light redirector positioned in the common output or input optical path of the second zigzag mux/demux between the edge filter and the second zigzag mux/demux.

11. The system of claim 10, wherein the first glass block or prism and the second glass block or prism comprise separate glass blocks or prisms.

12. The system of claim 10, wherein the first glass block or prism and the second glass block or prism comprise separate portions of a single glass block or prism.

13. The system of claim 12, further comprising a second light redirector:

positioned in the second plurality of input optical paths of e second zigzag mux/demux upstream of the second plurality of optical filters; or positioned in the second plurality of output optical paths of the second zigzag mux/demux downstream of the second plurality of optical filters.

14. The system of claim 12, wherein:

the opposite surface of the first glass block or prism and the opposite surface of the second glass block or prism comprise separate portions of a common surface of the single glass block or prism; and the first plurality of optical filters of the first zigzag mux/demux and the second plurality of optical filters of the second zigzag mux/demux are coupled to the common surface of the single glass block or prism.

15. The system of claim 10, wherein the edge filter comprises one or more layers configured to substantially redirect light having wavelengths greater than a threshold wavelength and to substantially transmit light having wavelengths less than the threshold wavelength.

16. The system of claim 10, wherein the first plurality of optical filters comprises:

a first bandpass optical filter configured to substantially transmit light having wavelengths within a first passband and substantially redirect light having wavelengths outside the first passband;

and a second bandpass optical filter configured to substantially transmit light having wavelengths within a second passband and substantially redirect light having wavelengths outside the second passband; and wherein the first passband does not substantially overlap with the second passband.

17. The system of claim 10, wherein the first plurality of optical filters comprises:

a first edge filter configured to substantially transmit light having wavelengths less than a first threshold wavelength and substantially redirect light having wavelengths greater than the first threshold wavelength; and a second edge filter configured to substantially transmit light having wavelengths less than a second threshold wavelength and substantially redirect light having wavelengths greater than the second threshold wavelength.

* * * * *